UNITED STATES PATENT OFFICE.

BENJAMIN TALBOT, OF PENCOYD, PENNSYLVANIA.

ART OF REFINING METALS.

SPECIFICATION forming part of Letters Patent No. 639,873, dated December 26, 1899.

Original application filed February 12, 1898, Serial No. 670,060. Divided and this application filed June 25, 1898. Serial No. 684,468. (No specimens.)

*To all whom it may concern:*

Be it known that I, BENJAMIN TALBOT, a resident of Pencoyd, in the county of Montgomery, State of Pennsylvania, have invented certain new and useful Improvements in the Art of Refining Metals, of which the following is a specification.

This invention is more particularly a process for use in refining iron, and is a division of my application filed February 12, 1898, Serial No. 670,060. Its principal objects are to produce a product of the degree of purity that may be desired by an operation of mixing and refining, to provide a suitable supply of metal refined to the grade required for the further refining operations of smaller furnaces, and to attain these results in a rapid and economical manner.

I have heretofore invented a process of purifying iron, which contemplates pouring or filtering the molten impure metal through a bath of liquid basic slag contained in a suitable receptacle by which the metalloids or other impurities of the iron are caused to combine with the basic elements of the slag, permitting the metal thus purified to be drawn off below, where it sinks by reason of its greater specific gravity, as will more fully appear by reference to Letters Patent of the United States No. 476,091.

My present invention contemplates the use of a reservoir-furnace of suitable construction conveniently located for receiving charges from one or more blast or cast-iron producing furnaces. In this furnace such charges are mixed to a uniform composition and purified or partially purified therein, this reservoir of metal serving as a source of supply for one or more refining-furnaces in which the process of refining is continued or completed. In this operation the reservoir-furnace is preheated and is charged with molten cast-iron in a number of different charges, which are there mixed and refined to the desired degree by means of oxid of iron or slag forming additions, such as iron cinders, ores, scales, lime, and limestone by which the silicon contained in the metal is oxidized as far as may be required for use in the steel-making furnace as a usual basic open-hearth furnace, and a more uniform grade of metal is obtained therefor. It will be obvious that this reduction of silicon from the blast-furnace metal and production of a practically unifom grade of metal for the steel-furnace materially facilitates the rapidity and economy of steel production.

The furnace adopted as the reservoir may be a usual form of the tilting variety adapted to pour off either, or both, metal or slag through one or more spouts, or the operation may be carried on in a fixed hearth by having a number of tap-holes at various levels in the bath.

Having thus described the nature of my invention and the manner in which the same is to be performed, I claim—

The mode herein described of making basic open-hearth steel, said mode consisting in conveying successive charges of molten iron from a blast-furnace into a storage-furnace of large capacity, mixing said charges in said storage-furnace, and maintaining them in molten condition therein, providing the molten metal in said storage-furnace with a slag covering not derived from the metal itself and capable of removing silicon from the molten metal, and withdrawing at intervals portions of the desiliconized iron from the storage-furnace and conveying the same to a basic open-hearth furnace for the manufacture of steel, substantially as specified.

In testimony whereof I have hereunto signed my name in the presence of the subscribing witnesses.

BENJAMIN TALBOT.

Witnesses:
THOMAS S. GATES,
CHARLES N. BUTLER.